United States Patent
Odiet

[19]

[11] Patent Number: 6,166,336

[45] Date of Patent: Dec. 26, 2000

[54] DIGITAL FORCE SENSOR WITH A MEASURING CELL ABLE TO BE DEFORMED ELASTICALLY AND METHOD FOR DIRECTLY MEASURING THE APPLICATION OF A FORCE

[75] Inventor: Maxime Odiet, Cormondrèche, Switzerland

[73] Assignee: Sysmelec SA, Neuchatel, Switzerland

[21] Appl. No.: 09/179,175

[22] Filed: Oct. 27, 1998

[30] Foreign Application Priority Data

Nov. 11, 1997 [EP] European Pat. Off. .............. 97119703

[51] Int. Cl.[7] ............................ G01G 3/14; G01G 23/02; G01G 7/00; G01G 23/00; G01L 1/04
[52] U.S. Cl. .................... 177/210 R; 177/154; 177/214; 177/229; 177/DIG. 3; 177/DIG. 4; 177/DIG. 5; 177/245; 73/862.634; 73/862.69
[58] Field of Search ....................... 177/DIG. 3, DIG. 6, 177/DIG. 2, DIG. 4, DIG. 5, 212, 214, 229, 25.13, 210 R, 210 FP, 154, 157, 158, 245; 73/862.69, 862.634, 862.638, 862.639, 1.13, 1.15

[56] References Cited

U.S. PATENT DOCUMENTS

| | | | |
|---|---|---|---|
| 2,944,157 | 7/1960 | McAuslan et al. ................... | 177/25.13 |
| 3,627,069 | 12/1971 | Ray et al. .......................... | 177/210 FP |
| 3,804,188 | 4/1974 | Fukuma ............................. | 177/25.13 |
| 3,805,600 | 4/1974 | Powell et al. ....................... | 177/211 |
| 3,826,318 | 7/1974 | Baumgartner ...................... | 177/25.13 |
| 3,967,271 | 6/1976 | Day ................................... | 177/210 FP |
| 3,968,848 | 7/1976 | Cherney et al. .................... | 177/122 |
| 4,072,201 | 2/1978 | Wiesler ............................. | 177/210 R |
| 4,094,371 | 6/1978 | Ferrell .............................. | 177/210 R |
| 4,155,413 | 5/1979 | Anget ................................ | 177/178 |
| 4,258,812 | 3/1981 | Pfeiffer ............................. | 177/210 R |
| 4,303,139 | 12/1981 | Hino et al. ........................ | 177/210 FP |
| 4,771,640 | 9/1988 | Matsuura .......................... | 73/862.639 |
| 4,838,369 | 6/1989 | Albert .............................. | 177/210 FP |
| 5,141,065 | 8/1992 | Maxwell et al. .................... | 177/210 R |
| 5,293,809 | 3/1994 | Van Der Heijdenn et al. ........ | 91/392 |
| 5,319,161 | 6/1994 | Miller et al. ...................... | 177/154 |

FOREIGN PATENT DOCUMENTS

| | | |
|---|---|---|
| 2 696 002 | 3/1994 | France . |
| 32 43 350 A1 | 9/1984 | Germany . |
| 1428 175 | 3/1976 | United Kingdom . |
| 2 184 996 | 7/1987 | United Kingdom . |
| WO 96/02814 | 2/1996 | WIPO . |

Primary Examiner—Randy W. Gibson
Attorney, Agent, or Firm—Griffin & Szipl, PC

[57] ABSTRACT

The digital force sensor (1) includes a measuring cell (2) which is able to be deformed elastically, the deformation of said cell (2) directly resulting from the force with which a robot arm approaches a discrete electronic component (11) in a magazine, then mounts it onto a printed circuit, and digital means (3) for measuring a displacement representative of the deformation of said cell (2), then supplying in response to said displacement a digital signal corresponding to the direct measurement of the force with which the robot arm approaches, then mounts the electronic component onto the printed circuit.

14 Claims, 5 Drawing Sheets

DIGITAL FORCE SENSOR WITH A MEASURING CELL ABLE TO BE DEFORMED ELASTICALLY AND METHOD FOR DIRECTLY MEASURING THE APPLICATION OF A FORCE

The invention concerns a digital force sensor with a measuring cell able to be deformed elastically for the precise measurement of a force and in particular the vertical application force of components of small dimensions such as electronic, optical, mechanical or similar components onto the surface of a substrate or another component. The invention also concerns a method for directly measuring the application of a force implementing the aforementioned sensor.

The mass series mounting of components of this type, at a low cost, on the surface of a substrate is usually achieved by means of a robot arm fitted at its free end with a suction grasping nozzle. In the case of an electronic component, the nozzle approaches the component to be mounted in a magazine in which it is arranged, picks it up by suction, then mounts it on the surface of a printed circuit which is in the process of being manufactured. In order to secure the components firmly to the circuit, a solder bed or conductive adhesive bed is first deposited, in a conventional manner, onto the contact pads connecting conductive paths of the printed circuit to each other.

Because of the ever increasing miniaturisation of the components and structures in which such components are used, the latter have to be positioned on their substrates with increased precision in order to obtain a satisfactory manufacturing yield. On the other hand, it has also proved indispensable to be able to control with a very high level of precision the force with which the component is applied onto the surface of its substrate. Indeed, too high an application force can cause mechanical deformation, or even irreversible destruction of the component during the mounting thereof on the substrate. Likewise, in the case of electronic components, during mounting of the component on the substrate, one tries to avoid any alteration or overflow of the solder or conductive adhesive bed which can cause, locally, the electric contact to break, or generate short circuits with the neighbouring conductive paths.

In order to overcome these difficulties, it is known in the prior art to fit the robot arm with an analogue piezo-electric type sensor whose operating principle is as follows: a piezo-electric crystal outputs an electric charge proportional to the mechanical deformation which it undergoes, such deformation resulting directly from the force with which the robot arm mounts the component onto the substrate. It is thus possible to measure, and thus to control continuously, the application force exerted by the robot arm on the component which has to be mounted on a substrate.

This first solution of the prior art nonetheless has a certain number of drawbacks, at the forefront of which should be cited the low intensity of the desired application force of the robot arm, typically less than ten grams, leading to limited deformation of the piezoelectric crystal and thus to a low output charge which must be amplified prior to any exploitation thereof. The drawbacks linked to the amplification of a weak electric signal are known. They comprise the electronic noise and distortion of the signal which lead to significant measuring errors which are detrimental to the accuracy of the measurement, said accuracy generally remaining limited to the neighbourhood of plus or minus 3 to 5%.

Another major drawback of the piezoelectric force sensor lies in the fact that its piezoelectric crystal is an extremely rigid element which undergoes small deformations for the level of forces to be measured in the aforementioned applications. Consequently, the operation of approaching with such a sensor becomes difficult if the maximum force having to be applied to a component is very small, for example less than 1 g, to the extent that a slight deformation of the piezoelectric element generates significant forces on the component, in particular in the event that the substrate is rigid. In order to take account of this limitation, the approaching speed of the grasping nozzle during picking up of the component and the mounting thereof onto the substrate must be slowed down, which is considerably prejudicial to the speed of mounting of the components and is thus contrary to gains in productivity.

A second known solution consists in fitting the robot arm with an analogue sensor of the resistive type including a deformable parallelogram-like structure with strain gauges. In a similar manner to that described hereinbefore, the deformation of the parallelogram and thus the variation in electric resistance of the gauges which is measured is directly representative of the application force. The problem of measuring very weak electric signals and the necessity for the amplification thereof which alters the measuring precision remains nonetheless raised. Moreover, this resistive sensor requires very precise calibration, does not age well and has drift problems.

A principle object of the invention is thus to overcome the drawbacks of the prior art described hereinbefore by proposing a digital force sensor in particular for the precise measurement of the vertical application force of components of small dimensions such as electronic, optical, mechanical or similar components onto the surface of a substrate or another component.

For this purpose and in conformity with the principle feature of the invention, the force sensor includes a measuring cell able to be deformed elastically, the deformation of such cell resulting directly from the application of a force, and digital means for measuring a vertical displacement representative of the deformation of the cell, then supplying in response to this displacement a digital electric signal corresponding to the direct measurement of the applied force.

As a result of these features, the force sensor according to the present invention provides numerous advantages from amongst which can be cited the use of an entirely digital system which provides, after calibration, a digital signal corresponding to the direct measurement of the application force. The problems linked to low output signal amplification of the analogue sensors of the prior art are thus avoided, and the measuring precision, approximately ten times greater than that of the piezoelectric sensors of the prior art, is in the neighbourhood of 0.3 to 0.5%.

Another advantage lies in the rapidity of response of the sensor's measuring cell which allows, for example, a robot arm to approach and mount the components onto their substrate more rapidly, hence a significant gain in mounting time and thus in productivity.

According to an advantageous feature, the present force sensor is associated with a stop for adjusting the measuring cell's stop position at its zero deformation position which corresponds to the absence of any force applied onto said cell. The stop also allows the damping of the sensor to be accelerated, and thus the components to be approached and mounted more rapidly, hence again significant gains in productivity.

According to a first embodiment of the invention, the digital force sensor includes a single elastically deformable parallelogram-like structure. This structure carries on its free outer vertical beam a moving linear incremental measuring device arranged facing a fixed measuring head of a digital axis. The displacement of the linear measuring device results directly from the deformation of the measuring cell and allows the force with which the robot arm mounts or applies the component onto the substrate to be measured.

According to a preferred embodiment of the invention, the deformable parallelogram-like structure is extended laterally by a second similar structure so as to constitute a more significant lever arm allowing the displacement of the linear incremental measuring device to be amplified for a given application force of the robot arm, which allows the resolution of the measurement to be substantially improved.

According to another aspect, the present invention also concerns a method according to which a mechanical deformation resulting from the application of a force is converted into a displacement representative of such deformation, and one measures and supplies in response to such displacement a digital electric signal corresponding to the direct measurement of the applied force.

Other features and advantages of the invention will appear upon reading the following description of a force sensor according to the invention given purely by way of illustrative and non limiting example, this description being made in conjunction with the drawings in which.

The present invention proceeds from the general inventive idea consisting in proposing a digital force sensor for measuring a force including an elastically deformable measuring cell, the deformation of such cell directly resulting from the application of force, and digital means measuring a displacement representative of the deformation of the measuring cell, then providing in response to such displacement a digital electric signal corresponding to the direct measurement of the applied force.

According to the method of the invention, this object is achieved by converting a mechanical deformation resulting from the application of a force, no longer directly into an analogue electric signal, but into a displacement representative of said mechanical deformation, and by measuring and supplying in response to such displacement, a digital signal corresponding to the direct measurement of the applied force.

The advantageous application of the force sensor according to the invention to the measurement of the relatively low application force of a discrete electronic component onto the surface of a printed circuit by a robot arm is described by way of non limiting example. It will nonetheless be understood that the present invention is not limited to this single example, and that it can be applied to any type of device or implementation method wherein it is necessary to measure the intensity of a force with a high level of precision.

Figure 1:
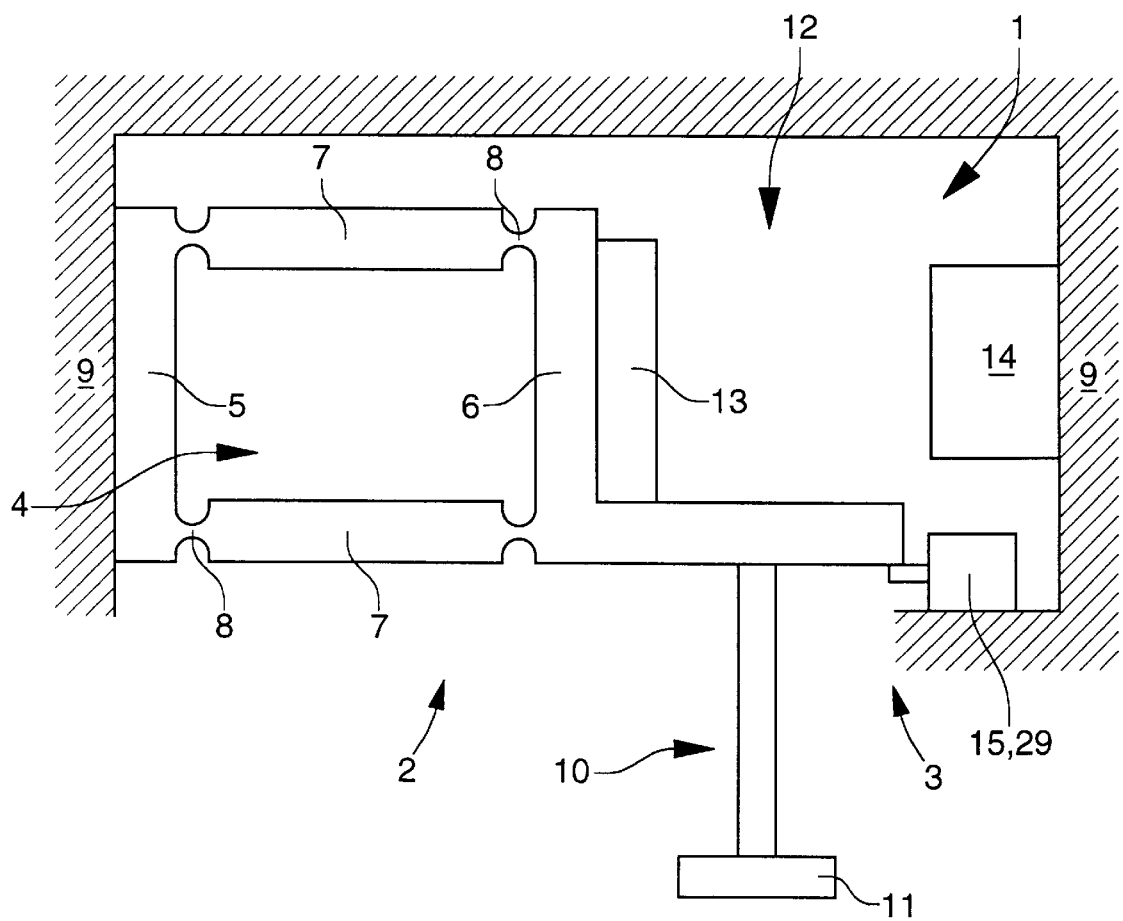
FIG. 1 is a schematic representation of the simplified embodiment of the digital force sensor according to the invention.

In the simplified embodiment shown schematically in FIG. 1, the digital sensor according to the invention, designated as a whole by the numerical reference 1, includes a measuring cell 2 able to be deformed elastically and digital measuring means 3.

Figure 6:
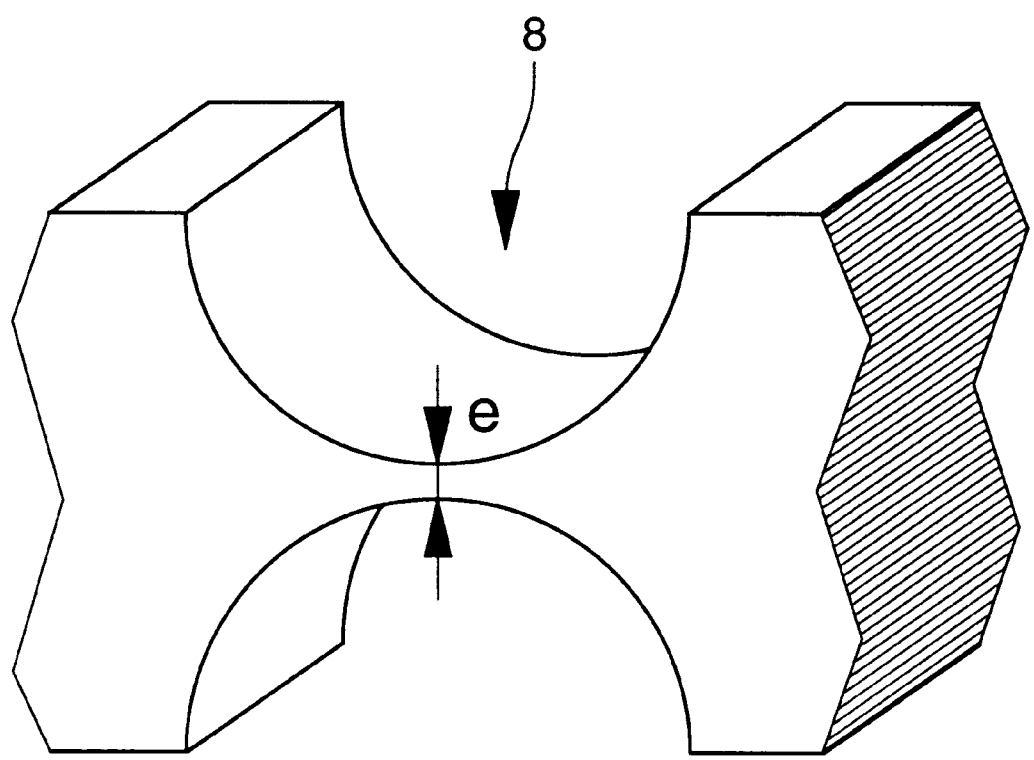
FIG. 6 is a detailed view showing one of the hinges of the measuring cell of the digital force sensor shown in FIGS. 3 to 5.

Measuring cell 2 is preferably made of steel. It can however also be made of aluminium or any other material having the required properties of elasticity. As shown in FIG. 1, measuring cell 2 is of the deformable parallelogram type comprising a parallelogram linkage 4 formed of two inner 5 and outer 6 vertical beams and two cross beams 7 in parallel pairs and pivotably connected to each other by elastic joints 8. These joints 8 can take the form of elastic necks or hinges. In the present description, the term <<hinge>> means a thin wall connecting two elements which can move in relation to each other, namely a vertical beam 5 or 6 and a cross beam 7. In the event that the measuring cell is made of steel, these hinges 8 can be obtained by wire Electro Discharge Machining and characteristically have a thickness e of the thin wall of the order of 20 to 50 microns for the described application. Their elasticity determines the resolution of the measurement. One example of such an elastic hinge 8 is shown in FIG. 6.

Measuring cell 2 is fixedly mounted by inner vertical beam 5 of deformable parallelogram 4 onto a frame 9 of a robot arm (not shown). It is fixed onto frame 9 by any appropriate means such as screwing, welding or suchlike. Outer vertical beam 6 of deformable parallelogram 4 is free and carries an interchangeable grasping nozzle 10, for example a suction nozzle, by means of which the robot arm picks up a discrete electronic component 11 by suction.

Digital measurement means 3 preferably take the form of a digital axis 12. This is a device well known to those skilled in the art, commonly used for measuring in a very precise manner the displacements of a moving element, in particular within the field of robotics. This digital axis 12 conventionally includes a linear incremental measuring device 13 attached to measuring cell 2 on free outer vertical beam 6 of deformable parallelogram 4, and a measuring head 14 fixedly mounted on frame 9 of the robot arm, facing linear incremental measuring device 13.

Linear incremental measuring device 13, attached to measuring cell 2 on free outer vertical beam 6 of deformable parallelogram 4 is thus mobile relative to fixed measuring head 14. Linear incremental measuring device 13 is preferably a contactless optical measuring unit, but it can also be a magnetic or other measuring unit. Force sensor 1 finally includes an adjustment stop 15 fixed onto frame 9 of the robot arm whose role will be described in detail hereinafter.

A complete operating cycle of digital force sensor 1 according to the invention will now be examined with reference to FIGS. 2A to 2D.

Figure 2A:
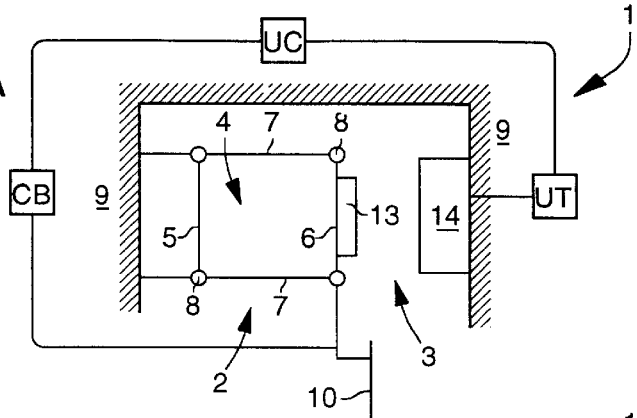
FIGS. 2A to 2D are a series of schematic views in which a complete operating cycle of the force sensor of FIG. 1 is shown.

In FIG. 2A, the robot arm is preparing to pick up a discrete electronic component 11 arranged in a magazine 16. Force sensor 1 is at rest.

Figure 2B:
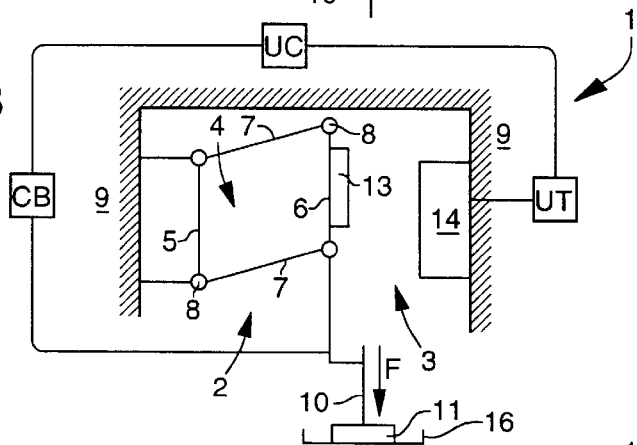

In FIG. 2B, grasping nozzle 10, attached to free outer vertical beam 6 of deformable parallelogram 4, approaches electronic component 11 arranged in its magazine 16 and exerts thereon a vertical pressure force F downwards. Under the effect of the reaction to this force F, parallelogram 4 of measuring cell 2 is elastically deformed upwards, which causes linear incremental measuring device 13 to move in front of measuring head 14 of digital axis 3. The latter detects this displacement and supplies in response a digital signal corresponding directly to the measurement of the displacement of linear incremental measuring device 13. Since the deformations of parallelogram 4 of measuring cell 2 and the corresponding displacements of linear incremental measuring device 13 have previously been calibrated using known forces, the displacement measurement provided by digital axis 3 can then be directly converted into force intensity by a processing unit UT which, via a central unit UC, controls an arm movement control unit CB. When the intensity of measured force F reaches a desired not-to-be-exceeded value, the lowering of grasping nozzle 10 onto electronic component 11 is interrupted and grasping nozzle 10 picks up component 11 by suction.

Figure 2C:
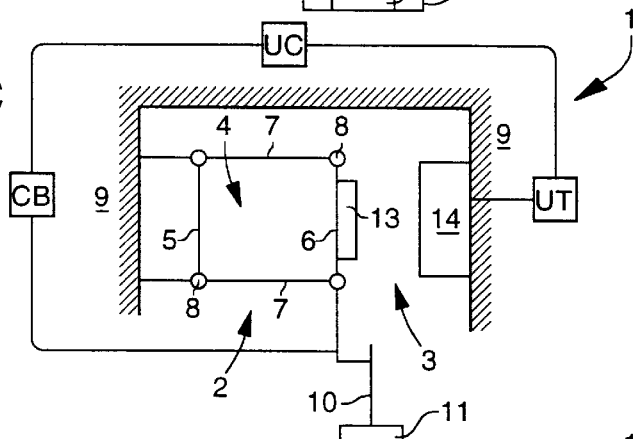

In FIG. 2C, the robot arm transfers electronic component 11 towards a printed circuit 17 during mounting. Force sensor 1 is at rest.

Figure 2D:
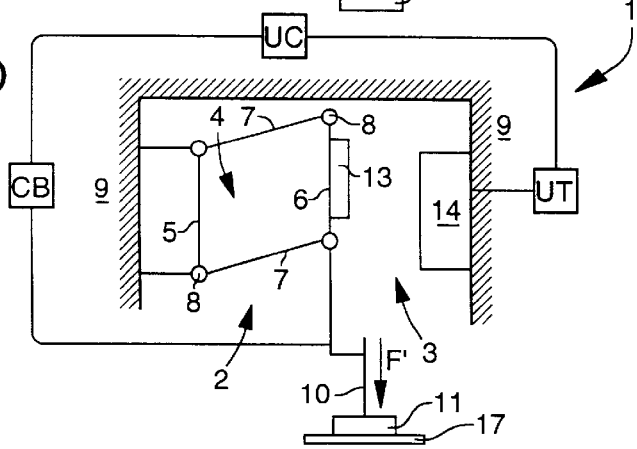

In FIG. 2D, the robot arm applies electronic component 11 onto printed circuit 17 with a vertical force F' directed downwards. The elastic deformation of parallelogram 4 of measuring cell 2 results directly from the intensity of this effort F'. Digital axis 3 measures the deformation of parallelogram 4 of measuring cell 2 via the displacement of linear incremental measuring device 13 and supplies in response a digital signal directly representing force F' with which the robot arm applies component 1 onto printed circuit 17. When force F' reaches a desired predetermined value, the robot arm releases component 1 and a new cycle can begin.

Force sensor 1 according to the invention allows very precise measurements able to be reproduced with a precision of the order of 0.1 grams to be effected. Care should be taken, during use, not to exceed the limit of elasticity of the material used for making measuring cell 2.

Figure 3:
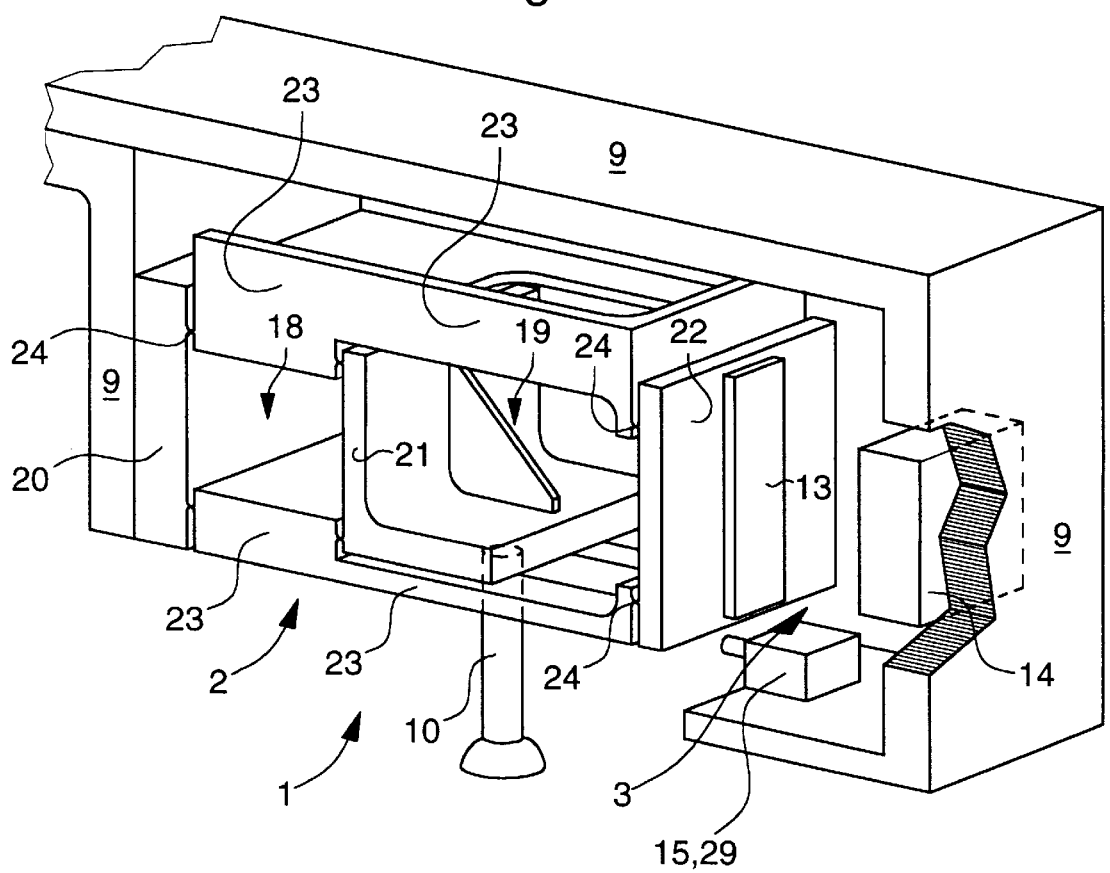
FIG. 3 is a perspective view of the preferred embodiment of the measuring cell of the digital force sensor according to the invention.
Figure 4:
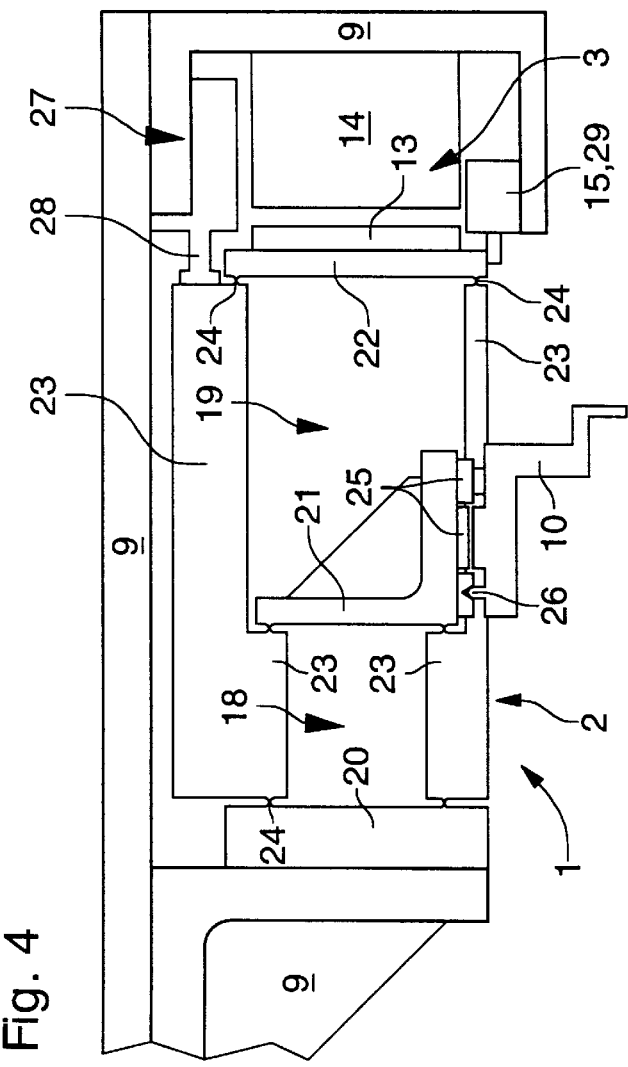
FIG. 4 is a plane view of the measuring cell shown in FIG. 3.
Figure 5:
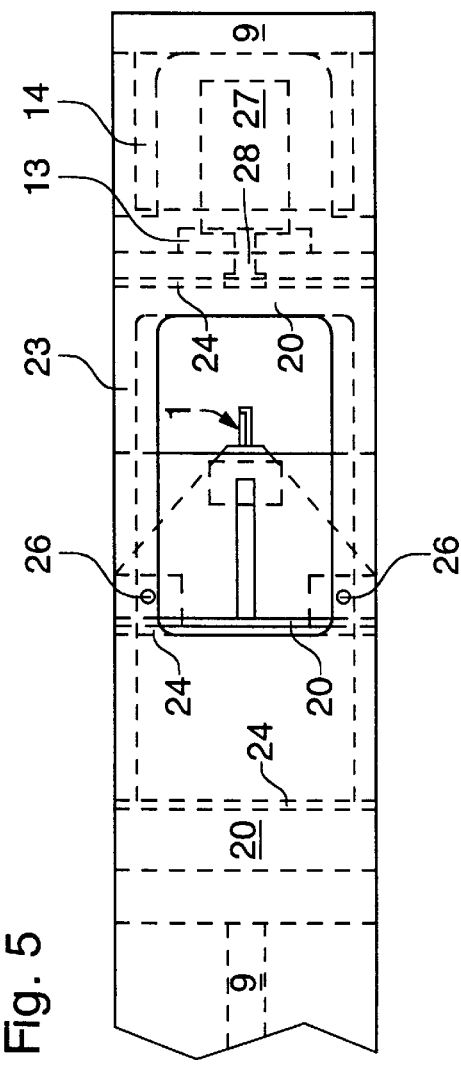
FIG. 5 is a side view of the measuring cell shown in FIG. 3.

According to a preferred embodiment of the invention shown in FIGS. 3 to 5, measuring cell 2 of digital force sensor 1 includes two juxtaposed deformable parallelogram-like structures 18 and 19. As previously, deformable parallelograms 18 and 19 include three inner, intermediate and outer vertical beams, respectively 20, 21 and 22, and parallel pairs of cross beams 23 connected to each other by elastic joints 24.

Linear incremental measuring device 13 is fixed onto outer vertical beam 22, so that the structure having two juxtaposed parallelograms 18 and 19 constitutes a more significant lever arm for said linear incremental measuring device 13, allowing the displacement thereof to be amplified for a given application force of the robot arm, which substantially improves the measurement resolution.

Grasping nozzle 10 of the robot arm is fixed onto intermediate vertical beam 21 of measuring cell 2 for example in a removable manner by means of magnets 25. It further includes positioning lugs 26 for the precise assembly thereof on said cell 2. Finally, a locking cylinder 27 immobilises measuring cell 2 with its rod 28 when said cell is not being used.

The assembly of force sensor 1 is completed by the aforecited adjusting stop 15. This stop 15 preferably takes the form of a cam device 29 whose angular position can be marked by digital means (not shown), and whose role will now be described in detail. Digital shaft position encoders suitable for marking or indicating the angular position of cam device 29 are well known.

Prior to use, an initial step of resetting measuring cell 2 to zero is performed. For this purpose, cam 29 is withdrawn and measuring cell 2 is allowed to oscillate freely about its position of equilibrium. The oscillation signal is recorded and allows the mean of the maximum and minimum elongation of measuring cell 2 to be calculated. The zero displacement position of linear incremental measuring device 13, which corresponds to the absence of any force applied onto measuring cell 2, in other words the zero force position, is then deducted from said mean. It is then sufficient to adjust by means of cam 29 the stop position of measuring cell 2 for such position to correspond to the zero force position determined hereinbefore. It will be understood that cam 29, acting in the manner of a stop, also accelerates the damping of force sensor 1 and thus allows grasping nozzle 10 to approach and mount electronic components 11 more rapidly onto printed circuit 17, hence significant gains in assembly time and thus in productivity.

It goes without saying that in addition to the embodiment described in the present Application, various simple modifications and variants fall within the scope of the present invention.

What is claimed is:

1. A sensor for directly measuring the application of a force, including an elastically deformable measuring cell, the deformation of said cell resulting directly from the application of the force, and digital measuring means for measuring a displacement representative of the deformation of said cell, then supplying in response to said displacement a digital electric signal corresponding to the direct measurement of the force applied and wherein said sensor cooperates with a stop which corresponds to the absence of any force applied to said cell.

2. A sensor according to claim 1, wherein the stop comprises a cam device.

3. A sensor according to claim 2, wherein the angular position of the cam device is marked by digital means.

4. A sensor according to claim 1, wherein the digital measuring means include a linear incremental measuring device and a measuring head placed facing each other and which move in relation to each other.

5. A sensor according to claim 4, wherein said linear incremental measuring device is attached to said measuring cell, and wherein said measuring head is fixedly mounted onto a frame.

6. A sensor according to claim 4, wherein said linear incremental measuring device is a contactless optical measuring unit.

7. A sensor according to claim 1, wherein said measuring cell includes at least one deformable parallelogram linkage, formed by vertical beams and cross beams in parallel pairs and connected to each other by elastic joints.

8. A sensor according to claim 7, wherein the elastic joints are hinges.

9. A sensor according to claim 8, wherein said hinges are thin wall hinges, the thickness of said walls being comprised between 20 and 50 microns.

10. A sensor according to claim 7, wherein said vertical beams comprise an inner vertical beam and an outer vertical beam and said measuring cell is fixedly mounted via said inner vertical beam of said deformable parallelogram linkage onto a frame, and wherein said outer vertical beam of said deformable parallelogram linkage is free and carries an interchangeable grasping nozzle and said linear incremental measuring device.

11. A sensor according to claim 7, wherein said vertical beams comprise an inner vertical beam and an outer vertical beam and said measuring cell is fixedly mounted via said inner vertical beam of said deformable parallelogram linkage onto a frame of a robot arm, and wherein said outer vertical beam of said deformable parallelogram linkage is free and carries said linear incremental measuring device, an interchangeable grasping nozzle being fixed onto an intermediate vertical beam.

12. A sensor according to claim 1, including a locking cylinder which immobilizes the measuring cell by a rod when said cell is not being used.

13. A sensor according to claim 5, wherein said linear incremental measuring device is a contactless optical measuring unit.

14. A method for calibrating a sensor for directly measuring the application of a force, said sensor including a measuring cell able to be deformed elastically, the deformation of said cell resulting directly from the application of the force, and digital means for measuring a displacement representative of the deformation of said cell, then supplying in response to said displacement a digital electric signal corresponding to the direct measurement of the force applied, wherein said method comprises the steps of:

prior to implementation of the sensor, an initial step of resetting the measuring cell to zero is performed leaving the latter to oscillate freely about its position of equilibrium, the oscillation signal being recorded and allowing the mean of the maximum and minimum elongations of said measuring cell to be calculated, calculating from said mean elongation of said cell the position of zero displacement of the linear incremental measuring device, which corresponds to the absence of any force applied onto the measuring cell, and adjusting a stop position of the measuring cell by means of a cam device so that the stop position corresponds to the zero force position determined herein before.

* * * * *